B. L. BOBROFF.
VEHICLE SIGNAL APPARATUS.
APPLICATION FILED DEC. 14, 1914.
1,162,442.
Patented Nov. 30, 1915.
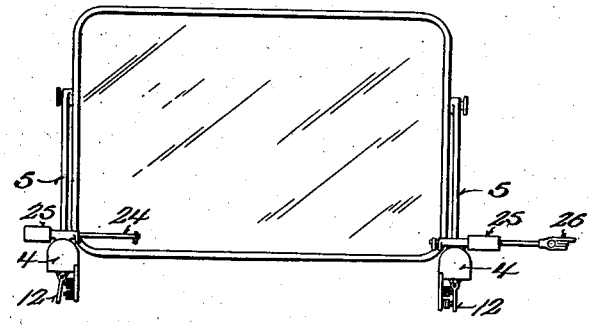
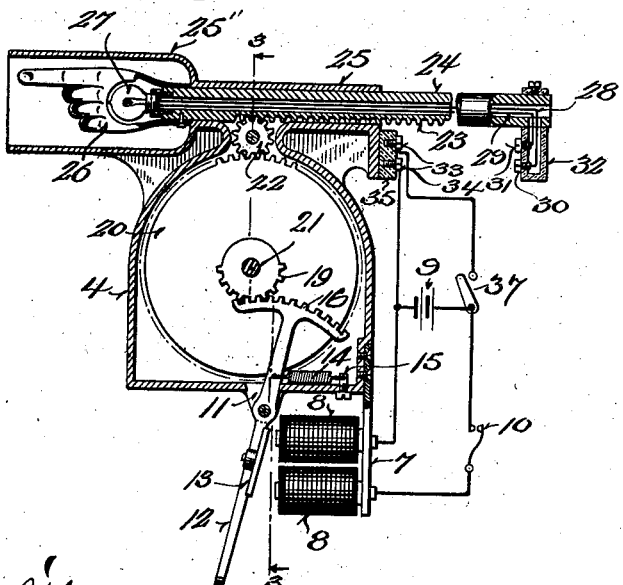
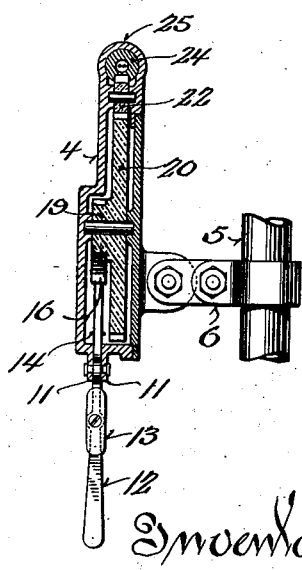

UNITED STATES PATENT OFFICE.

BORNETT L. BOBROFF, OF MILWAUKEE, WISCONSIN.

VEHICLE SIGNAL APPARATUS.

1,162,442. Specification of Letters Patent. Patented Nov. 30, 1915.

Application filed December 14, 1914. Serial No. 877,073.

*To all whom it may concern:*

Be it known that I, BORNETT L. BOBROFF, a citizen of the United States, and resident of Milwaukee, in the county of Milwaukee and State of Wisconsin, have invented certain new and useful Improvements in Vehicle Signal Apparatus; and I do hereby declare that the following is a full, clear, and exact description thereof.

My invention consists in what is herein particularly set forth with reference to the accompanying drawings and pointed out in the claims of this specification, its object being to provide motor vehicles with simple, economical and efficient means by which the driver of each may mechanically or electrically signal the direction of a proposed turning, instead of having to extend one of his hands from a side of a vehicle as is customary practice and obviously detrimental to good control of said vehicle.

Figure 1 of the drawings represents a front elevation of signal apparatus in accordance with my invention attached to windshield standards of an automobile; Fig. 2, a partly sectional elevation of signal apparatus as aforesaid, and Fig. 3, a cross-section of the same indicated by line 3—3 in Fig. 2.

Referring by numerals to the drawings, 4 indicates each of a pair of housings that are separately attachable to a windshield standard 5 or other convenient stationary part of a motor vehicle, at a side of the same. In Fig. 3 one of the housings is shown in connection with a clamp 6 attached to a support such as one of the windshield standards 5 aforesaid, and each housing is made separable to provide for access to the interior thereof.

Extending from each housing is a bracket 7 to which the coils 8 of an electro-magnet are attached, the magnet being in circuit with a conveniently arranged battery 9 or other source of electricity with the vehicle, and the make and break of the circuit is controlled by a push-button 10 or other suitable switch. In pivotal connection with lugs 11 of the housing is a lever 12 to which the armature 13 of the electro-magnet is attached, and the lever has play in a slot of said housing. A spring 14, in the housing, is connected to the lever and a screw-post 15, and said lever is operated either electrically or manually against resistance of the spring to effect the signaling operation hereinafter described.

The inner end of the lever is a sector-rack 16 in mesh with the pinion-hub 19 of a larger gear-wheel 20 having an axle 21 supported in the housing, and the largest gear-wheel meshes with a pinion 22 that is also mounted in said housing and meshed with a rack 23 of a horizontal hollow arm 24 for which the aforesaid housing is provided with a guide 25 as a part of the same, one end of the guide being enlarged to constitute a hood 25' in which a visible signal attached to said arm is normally concealed.

The arm 24 is a visible signal in itself, and it is preferable to have its outer end fast in a target 26 simulating a human hand, as is herein shown. The target is apertured and in the aperture is an incandescent electric-lamp 27 for which the arm 24 is provided with a socket. The lamp wires 28 and 29 extend through the arm 24, and they are respectively attached to contact screws 30, 31, in an insulating-bracket 32 extending at a right angle to said arm to which it is fastened. Other contact screws 33, 34, engaging a block 35 of insulation attached to the housing 4, are in the path of the contact-screws first aforesaid, and they constitute terminals of an electric-circuit controlled, as to make-and-break, by a switch 37. As herein shown, the same source of electricity may be included in both of the circuits shown and described.

By manual operation of the lever 12 or by closing the electro-magnet circuit, the herein described gear-train is put in motion to run out the arm 24 and target 26 therewith, and the switch-points of the lamp-circuit being bridged, the lamp 27 will be energized when the contacts 31 and 32 close on the other contacts 33, 34, in their outward path. On release of the lever there is contraction of the spring 14 to return said lever and parts in gear-train therewith to the normal position shown in Fig. 2.

Either signal is run out from normal position to indicate a direction of turning proposed by the driver of the vehicle equipped therewith, and said signal may be kept displayed until the turning is completed. The signal-mechanism can be arranged to be operated by a foot of the driver, in which case said driver has the use of both hands to control the vehicle when making a turn.

I claim:

1. The combination of a housing attachable to a motor vehicle at a side of the same and having a horizontal guide-extension, a lever fulcrumed in connection with the housing, a signal in gear-train connection with the lever to be moved horizontally out and in the guide-extension of said housing, an electric-lamp constituting part of the signal, and an electric-circuit in which the lamp is included when the signal is displayed.

2. The combination of a housing attachable to a motor vehicle at a side of the same and having a horizontal guide-extension, a lever fulcrumed in connection with the housing, a signal in gear-train connection with the lever to be moved horizontally out and in the guide-extension of said housing, an electric-lamp constituting part of the signal, its wires being attached to insulated contacts carried by said signal; and electric-circuit terminal contacts having insulated connection with the aforesaid housing in the outward path of the first named contacts.

3. The combination of a housing attachable to a motor vehicle at a side of the same and having a horizontal guide-extension, a lever fulcrumed in connection with the housing, and a signal having a hollow rack-arm in gear-train connection with the lever, said signal being normally concealed by said housing-extension in which the rack-arm has horizontal movement, an electric-lamp with the signal having its wires extended through said arm and attached to insulated outer contacts therewith, and electric-circuit contacts having insulated connection with the aforesaid housing in the outward path of the contacts first named.

4. The combination of a housing attachable to a motor vehicle at a side of the same and having a horizontal guide-extension, a bracket with the housing and to which an electro-magnet is attached, a spring-controlled lever fulcrumed in connection with said housing and constituting the armature of the magnet, a signal in gear-train connection with the lever to be moved horizontally out and in the housing in which it is normally concealed, means for energizing said magnet to operate said lever against spring-resistance, an electric-lamp constituting part of the signal, an electric-circuit in which the lamp is included when the signal is displayed.

In testimony that I claim the foregoing I have hereunto set my hand at Milwaukee in the county of Milwaukee and State of Wisconsin in the presence of two witnesses.

B. L. BOBROFF.

Witnesses:
N. E. OLIPHANT,
M. E. DOWNEY.